(12) United States Patent
Lee et al.

(10) Patent No.: US 12,720,220 B2
(45) Date of Patent: Aug. 25, 2026

(54) APPARATUS AND METHOD FOR PIXEL BINNING FOR CHARGE-DOMAIN CMOS TDI IMAGING

(71) Applicant: TELEDYNE DIGITAL IMAGING, INC., Toronto (CA)

(72) Inventors: Hyun Jung Lee, Waterloo (CA); Paul Donegan, Kitchener (CA)

(73) Assignee: TELEDYNE DIGITAL IMAGING, INC., Toronto (CA)

( * ) Notice: Subject to any disclaimer, the term of this patent is extended or adjusted under 35 U.S.C. 154(b) by 158 days.

(21) Appl. No.: 18/356,840

(22) Filed: Jul. 21, 2023

(65) Prior Publication Data

US 2025/0030955 A1 Jan. 23, 2025

(51) Int. Cl.

| | |
|---|---|
| ***H04N 25/46*** | (2023.01) |
| ***H04N 25/767*** | (2023.01) |
| ***H04N 25/768*** | (2023.01) |

(52) U.S. Cl.
CPC .......... *H04N 25/46* (2023.01); *H04N 25/767* (2023.01); *H04N 25/768* (2023.01)

(58) Field of Classification Search
CPC ...... H04N 25/46; H04N 25/71; H04N 25/711; H04N 25/713; H04N 25/72; H04N 25/767; H04N 25/768
See application file for complete search history.

(56) References Cited

U.S. PATENT DOCUMENTS

2006/0109352 A1* 5/2006 Draijer .................. H04N 23/84 348/E3.02
2007/0064135 A1* 3/2007 Brown ................ H04N 25/745 348/E3.018
2017/0048467 A1 2/2017 Chuang et al.

FOREIGN PATENT DOCUMENTS

EP 1955538 B1 5/2018

* cited by examiner

*Primary Examiner* — Daniel M Pasiewicz
(74) *Attorney, Agent, or Firm* — K&L Gates LLP

(57) ABSTRACT

A pixel binning apparatus and a method for a charge-domain CMOS TDI image sensor, comprising a row of a first transfer gate coupled to a first row of a plurality of pixel registers, a plurality of binning registers coupled to the first transfer gate, a plurality of second transfer gates coupled to the plurality of binning registers, and a row of storage registers coupled to the plurality of second transfer gates.

9 Claims, 6 Drawing Sheets

APPARATUS AND METHOD FOR PIXEL BINNING FOR CHARGE-DOMAIN CMOS TDI IMAGING

FIELD

This disclosure relates to the field of pixel binning for charge-domain complementary metal-oxide semiconductor (CMOS) time delay and integration (TDI) image sensors.

SUMMARY

In part, in one aspect, the disclosure relates to a pixel charge binning apparatus of a CMOS TDI image sensor, comprising a row of a first transfer gate coupled to a first row of a plurality of pixel registers arranged in the form of a matrix, a plurality of binning registers coupled to the first transfer gate, a plurality of second transfer gates coupled to the plurality of binning registers, and a row of storage registers coupled to the plurality of second transfer gates.

In another aspect, the disclosure relates to a bidirectional CMOS TDI image sensor comprising a plurality of pixel registers, a first binning apparatus coupled to one end of the plurality of pixel registers, and a second binning apparatus coupled to the other end of the plurality of pixel registers.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

This disclosure is to implement pixel binning in the charge domain for a CMOS TDI image sensor. Pixel binning is a technique to combine charges collected by several adjacent pixels. For some imaging applications, high speed or high sensitivity is achieved by pixel binning at the expense of the spatial resolution of the image sensor.

Figure 1:
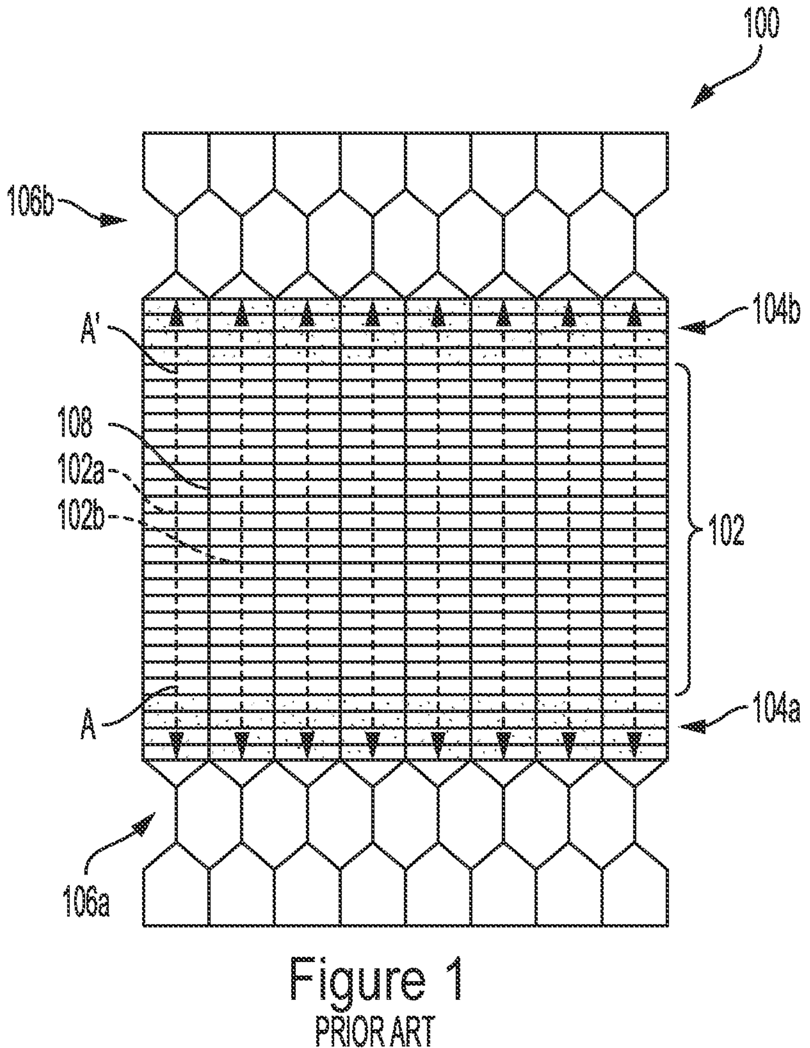
FIG. 1 is a block diagram of a conventional CMOS TDI image sensor.

FIG. 1 is a block diagram of a conventional CMOS TDI image sensor 100. The conventional CMOS TDI image sensor 100 comprises a plurality of pixel registers 102 arranged in the form of a matrix and a plurality of the corresponding column-parallel circuits 106*a* and 106*b*. At each end of the pixel registers is a light-shielded region 104*a* and 104*b*, respectively. The pixel registers 102 transfer pixel charge along each column of the matrix either to one TDI scanning direction indicated by arrow A or to the other TDI scanning direction indicated by arrow A' and read out charges either to the corresponding column-parallel circuit 106*a* or 106*b*. A channel stop 108 separates charges between neighboring columns 102*a* and 102*b*.

This column-based structure makes it impossible to transfer charges across multiple columns over the channel stops 108 for lateral binning in the charge domain (i.e., charge binning in a direction transverse to the longitudinal direction indicated by arrow A or A'). Thus, such binning operation is performed digitally in the conventional CMOS TDI image sensor. However, digital binning is not a noiseless summation and thus it is inferior to charge binning in terms of the signal-to-noise ratio.

Figure 2:
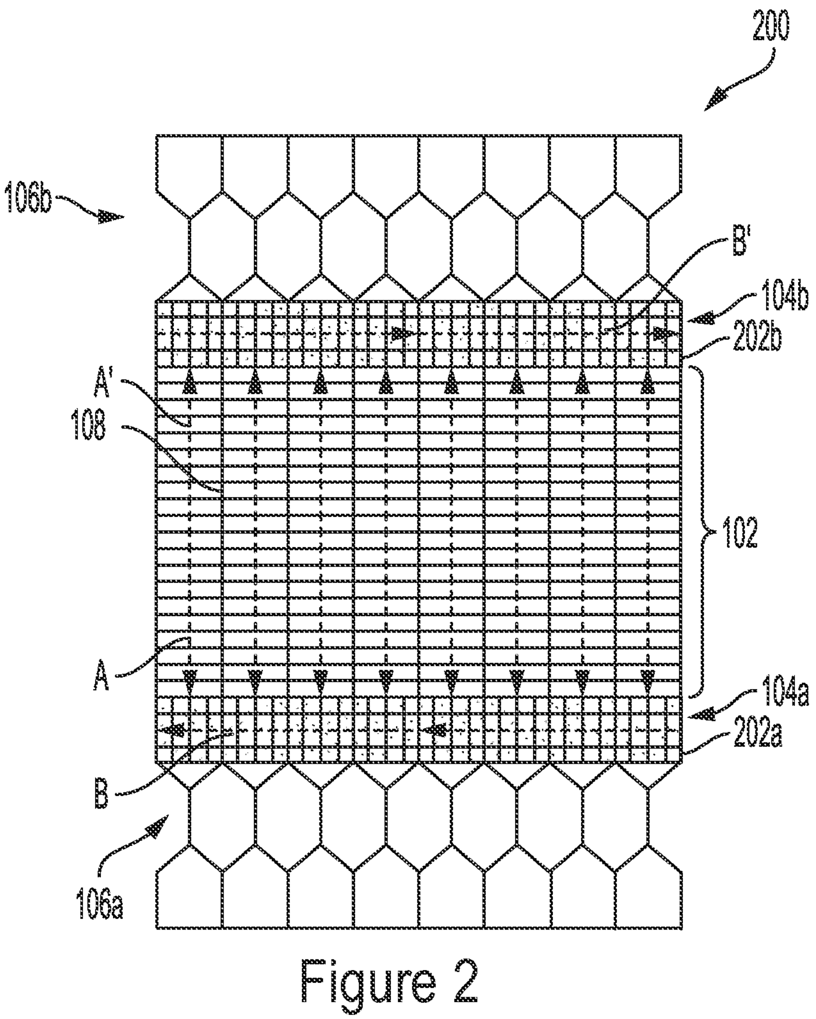
FIG. 2 is a block diagram of a pixel-binning CMOS TDI image sensor according to an exemplary embodiment of the disclosure.

FIG. 2 is a CMOS TDI image sensor 200 employing pixel binning in the charge domain according to an exemplary embodiment of the disclosure. The image sensor 200 comprises a first and a second pixel binning apparatus 202*a* and 202*b*. The first and the second pixel binning apparatus 202*a* and 202*b* are inserted into the first and the second light shielded region 104*a* and 104*b* of the image sensor 200, respectively.

In one general aspect of the present disclosure, the first pixel binning apparatus 202*a* comprises a first transfer gate 302*a* disposed along a row and coupled to one end (i.e., row 110) of the plurality of pixel registers 102, a first plurality of binning registers 304*a* coupled to the first transfer gate 302*a*, a plurality of second transfer gates 306 coupled to the first plurality of binning registers 304*a*, and a first row of a plurality of first storage registers 308*a* coupled to the plurality of second transfer gates 306. These configurations are shown in more detail in FIG. 3.

In one general aspect of the present disclosure, the second pixel binning apparatus comprises a third transfer gate disposed along a row and coupled to the other end of the plurality of pixel registers 102, a second plurality of binning registers coupled to the third transfer gate, a plurality of fourth transfer gates coupled to the second plurality of binning registers, and a first row of a plurality of second storage registers coupled to the plurality of fourth transfer gates.

Figure 3:
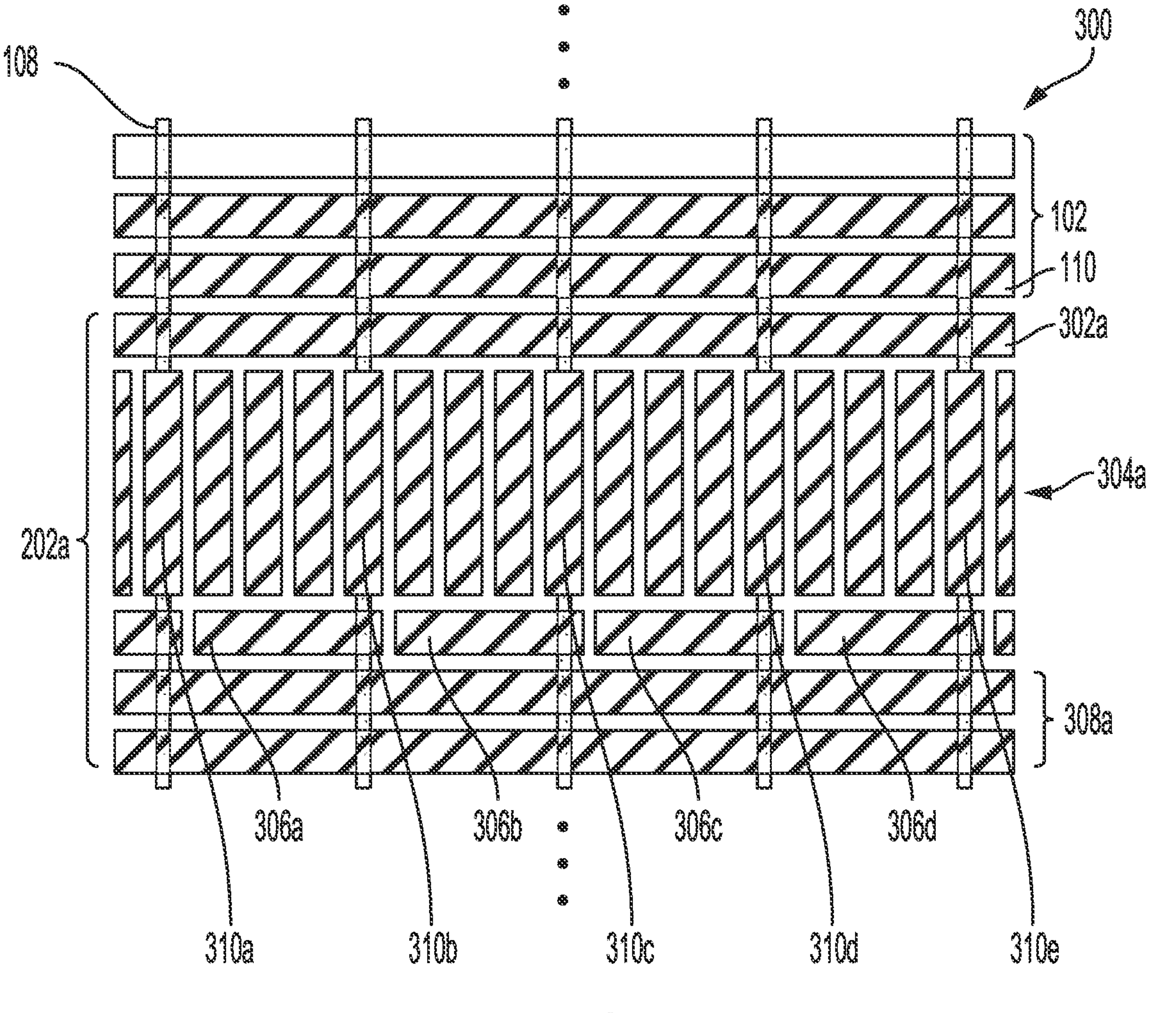
FIG. 3 is a detailed view of the image sensor of FIG. 2 according to an exemplary embodiment of the disclosure.

FIG. 3 is a detailed view 300 of the image sensor 200 showing the plurality of pixel registers 102 and the first pixel binning apparatus 202*a* for four times binning operation according to an exemplary embodiment of the disclosure. The first pixel binning apparatus 202*a* comprises a row of a first transfer gate 302*a* (TG1) coupled between a first row 110 of the plurality of pixel registers 102 and the four columns of binning registers 304*a*. A group of second transfer gates 306 (TG2) comprising a first second transfer gate 306*a* (TG2-1), a second second transfer gate 306*b* (TG2-2), a third second transfer gate 306*c* (TG2-3), and a fourth second transfer gate 306*d* (TG2-4) coupled between the binning registers 304*a* and a first row of the storage registers 308*a*. The binning registers 304*a* oriented orthogonal to the plurality of pixel registers 102 do not have the channel stop 108. This structure enables the binning registers 304*a* to transfer charge transversely to the pixel registers 102 as indicated by arrows B and B' in FIG. 2. In various aspects, the group of second transfer gates 306 can comprise additional or fewer second transfer gates for additional or fewer times binning.

Figures 4A, 4B, 4C, 4D, 4E, 4F, 4G, 4H, 4I:
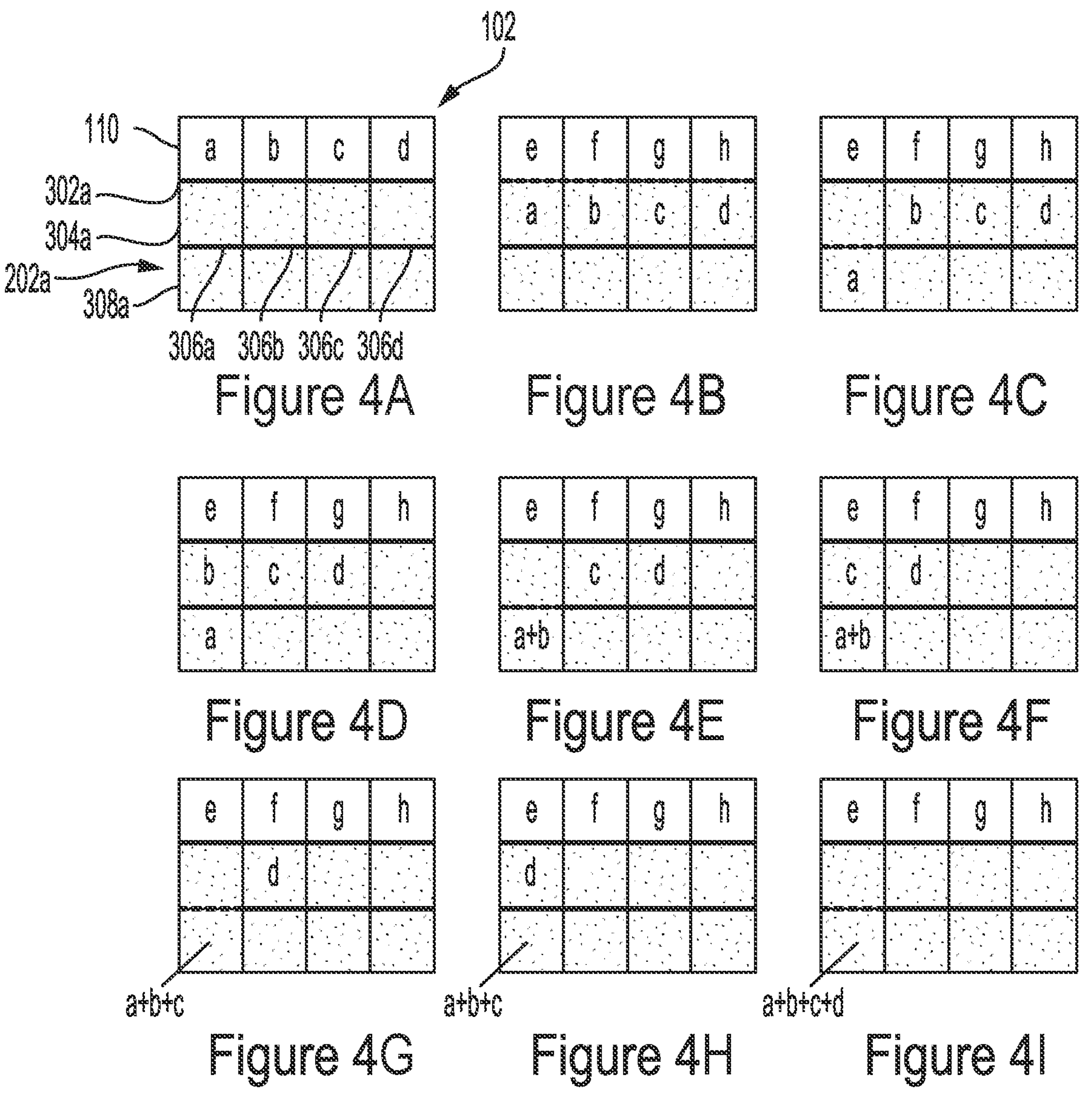
FIGS. 4A-4I are a detailed operational sequence of the pixel binning apparatus for four times binning according to an exemplary embodiment of the disclosure.

FIGS. 4A-I illustrate a detailed operational sequence of the pixel binning apparatus for four times binning according to an exemplary embodiment of the disclosure. With reference now to FIG. 4A together with FIGS. 2 and 3, the first pixel binning apparatus 202*a* comprises the first transfer gate 302*a* coupled to a first row 110 of the plurality of pixel registers 102, the four columns of the binning registers 304*a* coupled to the first transfer gate 302*a*, a group of four second transfer gates 306 coupled to the four columns of the binning registers 304*a*, and the storage register 308*a* coupled to the group of four second transfer gates 306.

At the first stage illustrated in FIG. 4A, the first row 110 of the plurality of pixel registers 102 stores charge (a, b, c, d) in each of the pixel registers. The first transfer gate 302*a* is clocked low (denoted by a thick solid line) to store the charges in the pixel registers.

At the second stage illustrated in FIG. 4B, the first transfer gate 302*a* is clocked high (denoted by a thick dashed line) and transfers the charge (a, b, c, d) from each of the pixel registers 102 to the corresponding binning register 304*a* below. The first row 110 receives the next charge (e, f, g, h) in each pixel. The first transfer gate 302*a* is clocked low to hold the charge (e, f, g, h) in the first row 110 until the binning operation illustrated from FIGS. 4C-I is completed.

At the third stage illustrated in FIG. 4C, the first second transfer gate 306*a* is clocked high to transfer the first charge (a) stored in the first binning register above the first second transfer gate 306*a* to the storage register 308*a* below the first second transfer gate 306*a*. The second second transfer gate 306*b*, the third second transfer gate 306*c*, and the fourth second transfer gate 306*d* are clocked low to store the remaining charges (b, c, d) in the rest of the binning registers 304*a*, respectively.

At the fourth stage illustrated in FIG. 4D, the binning registers 304*a* laterally transfer the remaining charges (b, c, d) stored in the binning registers 304*a* by a column. The binning registers 304*a* do not have the channel stop 108 to prevent charges from being transferred. The second charge (b) is now located in the first column of the binning registers 304*a*.

At the fifth stage illustrated in FIG. 4E, the first second transfer gate 306*a* transfers the second charge (b) to the storage register 308*a*. The first charge (a) and the second charge (b) are added (a+b) in the storage register 308*a*. The second second transfer gate 306*b*, the third second transfer gate 306*c*, and the fourth second transfer gate 306*d* are clocked low to store the remaining charges (c, d) in the rest of the binning registers 204*b*, respectively.

At the sixth stage illustrated in FIG. 4F, the binning registers 304*a* laterally transfer the remaining charges (c, d) stored in the binning registers 304*a* by a column. The third charge (c) is now located in the first column of the binning registers 304*a*.

At the seventh stage illustrated in FIG. 4G, the first second transfer gate 306*a* transfers the third charge (c) to the storage register 308*a*. The first charge (a), the second charge (b), and the third charge (c) are added (a+b+c) in the storage register 308*a*. The second second transfer gate 306*b*, the third second transfer gate 306*c*, and the fourth second transfer gate 306*d* are clocked low to store the remaining charge (d) in the binning registers 304*a*.

At the eighth stage illustrated in FIG. 4H, the binning registers 304*a* laterally transfer the remaining charge (d) stored in the binning registers 304*a* by a column. The fourth charge (d) is now located in the first column of the binning registers 304*a*.

At the ninth stage illustrated in FIG. 4I, the first second transfer gate 306*a* transfers the fourth charge (d) to the storage register 308*a*. The first charge (a), the second charge (b), the third charge (c), and the fourth charge (d) are added (a+b+c+d) in the storage register 308*a*. The second second transfer gate 306*b*, the third second transfer gate 306*c*, and the fourth second transfer gate fourth 306*d* are clocked low. The four times binning operation is now completed.

The stages described in connection with FIGS. 4A-I repeat with the next row of charges (e, f, g, h) and so on.

The stages illustrated in FIGS. 4A-I are exemplary of four times binning. For n times binning in general, a row of the first transfer gate transfers a row of charges from the plurality of pixel registers to the plurality of binning registers. The first gate out of every n second transfer gates transfers the charge stored in the first binning register to the storage register below the first second transfer gate while the rest of charges in the binning registers is held. The binning registers then shift the remaining row of charges laterally by a column. The process of transferring to the storage register and laterally shifting repeats n−1 times total to thus add n columns of charges.

When binning is disabled, only the first phase (310*a*, 310*b*, 310*c*, 310*d*, and 310*e*) of the binning registers between adjacent binning register columns is clocked low while a row of signal charges from the plurality of pixel registers is transferred through the plurality of binning registers by a row of the first transfer gates and subsequently to a row of storage registers by the plurality of second transfer gates.

Figure 5:
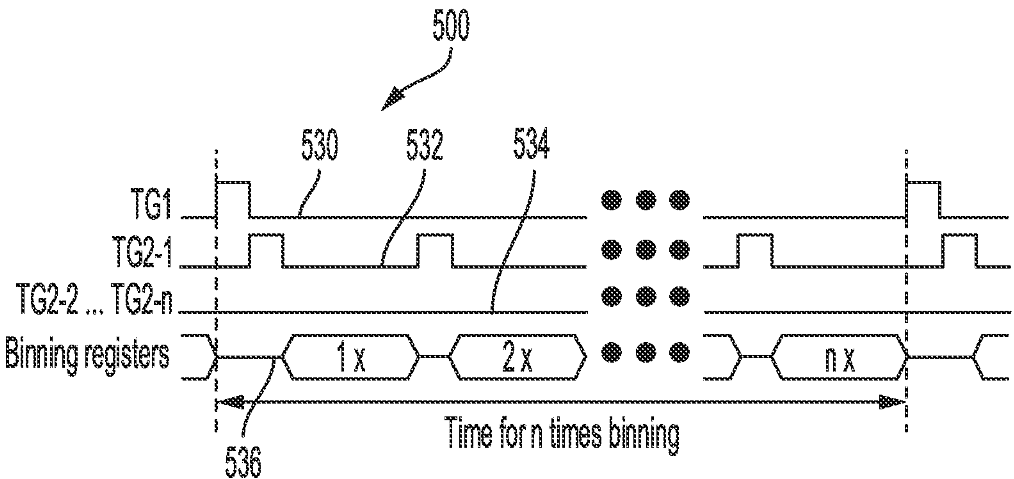
FIG. 5 is a timing diagram for the operation of the pixel binning apparatus according to an exemplary embodiment of the disclosure.

FIG. 5 is a timing diagram 500 for n times binning operation of the pixel binning apparatus according to an exemplary embodiment of the disclosure. With reference now to FIG. 5 together with FIGS. 2, 3, and 4A-I, a row of the first transfer gate (TG1) has a timing waveform 530. When the first transfer gate (TG1) is clocked high, a row of charges stored in the first row of the plurality of pixel registers is transferred to the plurality of the binning registers. The first transfer gate (TG1) is then clocked low to hold the next row of charges in the first row of the plurality of pixel registers.

With continued reference to FIG. 5 together with FIGS. 2, 3, and 4A-I, the first second transfer gate (TG2-1) has a timing waveform 532. The rest of second transfer gates (TG2-2, TG2-3, . . . , TG2-*n*) has a timing waveform 534. Subsequent to the row of charges transferring into the plurality of binning registers, the first second transfer gate (TG2-1) is clocked high to transfer the first charge from the first binning register to the storage register below while the remaining second transfer gates (TG2-2, TG2-3, . . . , TG2-*n*) are clocked low.

After the charge in the binning column above the first second transfer gate (TG2-1) is transferred to the storage register, the first second transfer gate (TG2-1) is clocked low. The binning registers transfer the remaining charges laterally by a column. The transferring of charge to the storage register and the lateral transfers of the remaining charges are repeated n times. Subsequently, the entire process repeats with the next plurality of charges.

Figure 6:
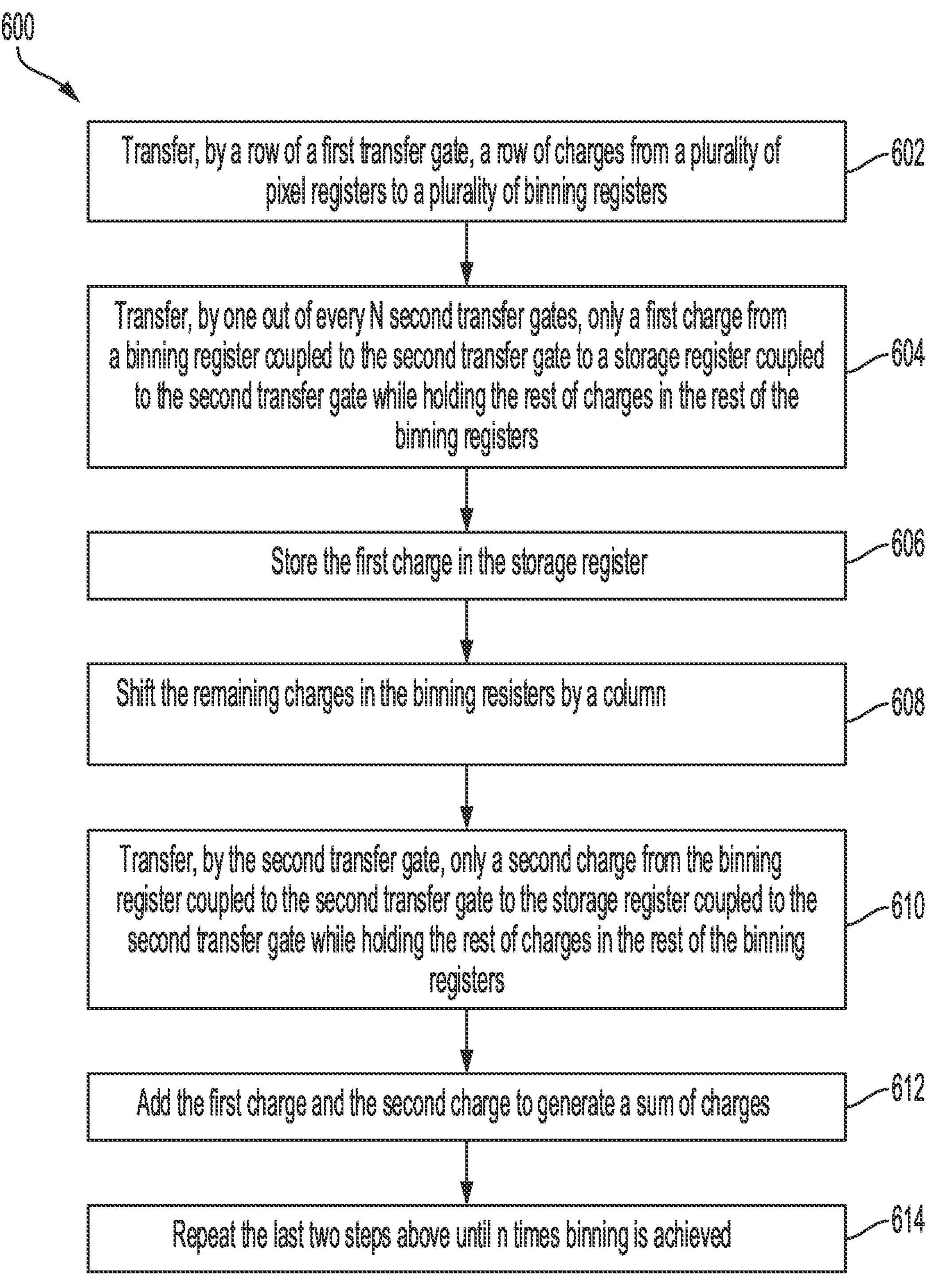
FIG. 6 is a logic flow diagram of a method of the operation of the pixel binning apparatus according to an exemplary embodiment of the disclosure.

FIG. 6 is a logic flow diagram 600 of a method of operating the pixel binning apparatus according to an exemplary embodiment of the disclosure. With reference now to FIG. 6 together with FIGS. 2-5, according to the method 600 of operating the pixel binning apparatus, a row of a first transfer gate transfers 602 a row of charges from a plurality of pixel registers to a plurality of binning registers. Subsequently, according to the method 600 of pixel binning, one out of every N second transfer gates transfers 604 only a first charge from a binning register coupled to the second transfer gate to a storage register coupled to the second transfer gate while holding the rest of charges in the rest of the binning registers. According to the method 600 of operating the pixel binning apparatus, the first charge is stored 606 in the storage register and the rest of charges in the binning registers is shifted 608 by a column. According to the method 600 of operating the pixel binning apparatus, the second transfer gate transfers 610 only a second charge from the binning register coupled to the second transfer gate to the storage register coupled to the second transfer gate while holding the rest of charges in the rest of the binning registers. The first charge and the second charge are added 612 to generate a sum of charges. According to the method 600 of operating the pixel binning apparatus, the last transfer 610 and add 612 steps are repeated 614 until n times binning is achieved.

In one aspect, according to the method 600 of operating the pixel binning apparatus, a row of the first transfer gate is coupled to a first end of the plurality of pixel registers and another row of the first transfer gate is coupled to a second end of the plurality of pixel registers. The method 600 of operating the pixel binning apparatus is performed using one of the two rows of the first transfer gate in response to a direction of TDI scanning for bidirectional operation.

Having thus described several aspects and embodiments of the technology of this application, it is to be appreciated that various alterations, modifications, and improvements will readily occur to those of ordinary skill in the art. Such alterations, modifications, and improvements are intended to be within the scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A pixel binning apparatus of a charge-domain CMOS Time Delay and Integration (TDI) image sensor, wherein the binning apparatus is coupled to a plurality of active Charge-Coupled Device (CCD) pixel registers arranged in a form of a matrix, comprising:

- a row of a first transfer gate coupled to a first row of a plurality of pixel registers;
- a plurality of binning registers coupled to the first transfer gate, wherein the binning registers are disposed orthogonally to the pixel registers, wherein a channel stop disposed between two adjacent columns of the plurality of pixel registers does not exist between two adjacent binning registers;
- a plurality of second transfer gates coupled to the plurality of binning registers; and
- a row of storage registers coupled to the plurality of second transfer gates, wherein the channel stop extends from a first end of the pixel registers to a second end of the pixel registers and through the first transfer gate, wherein the channel stop is disposed between each of the adjacent pixel registers of the plurality of pixel registers, wherein the channel stop is disposed between each gate of the second transfer gates.

2. The image sensor of claim 1, wherein the binning apparatus is located in a light shielded region of the image sensor.

3. The image sensor of the claim 1, comprising:

- a first binning apparatus coupled to one end of the plurality of pixel registers; and
- a second binning apparatus coupled to the other end of the plurality of pixel registers for bidirectional scanning operation.

4. An image sensor comprising:

- a plurality of pixel registers arranged in a form of a matrix;
- a first binning apparatus coupled to one end of the plurality of pixel registers, the first binning apparatus comprising:
  - a row of a first transfer gate coupled to a first row of a plurality of pixel registers;
  - a plurality of binning registers coupled to the first transfer gate, wherein the binning registers are disposed orthogonally to the pixel registers, wherein a channel stop disposed between two adjacent columns of the plurality of pixel registers does not exist between two adjacent binning registers;
  - a plurality of second transfer gates coupled to the plurality of binning registers; and
  - a row of storage registers coupled to the plurality of second transfer gates, wherein the channel stop extends from a first end of the pixel registers to a second end of the pixel registers and through the first transfer gate, wherein the channel stop is disposed between each of the adjacent pixel registers of the plurality of pixel registers, wherein the channel stop is disposed between each gate of the second transfer gates; and
- a second binning apparatus coupled to the other end of the plurality of pixel registers.

5. The image sensor of claim 4, wherein the first binning apparatus and the second binning apparatus are located in light shielded regions of the image sensor.

6. The image sensor of claim 4, wherein the image sensor is a charge-domain CMOS Time Delay and Integration (TDI) image sensor.

7. A method of pixel binning, comprising:

transferring, by a row of a first transfer gate, a row of charges from a plurality of pixel registers to a plurality of binning registers, wherein binning is enabled for n number of pixel columns;

transferring, by one out of every n number of a plurality of second transfer gates, only a first charge from a binning register coupled to the second transfer gate to a storage register coupled to the second transfer gate while holding the rest of charges in the rest of the binning registers, wherein the binning registers are disposed orthogonally to the pixel registers, wherein a channel stop disposed between two adjacent columns of the plurality of pixel registers does not exist between two adjacent binning registers;

storing the first charge in the storage register;

shifting the remaining charges in the binning registers by a column;

transferring, by the second transfer gate, only a second charge from the binning register coupled to the second transfer gate to the storage register coupled to the second transfer gate while holding the rest of charges in the rest of the binning registers, wherein the channel stop extends from a first end of the pixel registers to a second end of the pixel registers and through the first transfer gate, wherein the channel stop is disposed between each of the adjacent pixel registers of the plurality of pixel registers, wherein the channel stop is disposed between each gate of the second transfer gates;

adding the first charge and the second charge to generate a sum of charges; and repeating the transferring and the adding until n times binning is achieved.

8. The method of claim 7, further comprising disabling binning by:

clocking only a first phase of the binning registers between two adjacent binning register columns low;

transferring, by a row of the first transfer gate, a row of signal charges from the plurality of pixel registers to the plurality of binning registers; and transferring, by the plurality of second transfer gates, a row of the charges from the plurality of binning registers to a row of storage registers.

9. The method of claim 7, wherein:

a row of the first transfer gate is coupled to a first end of the plurality of pixel registers;

another row of the first transfer gate is coupled to a second end of the plurality of pixel registers; and the method is performed using one of the row of the first transfer gate or the another row of the first transfer gate in response to a direction of TDI scanning for bidirectional operation.

* * * * *